2,967,197
DIFUNCTIONAL ALIPHATIC COMPOUNDS PREPARED FROM PEROXIDES AND HALOGENS

Gifford W. Crosby, River Forest, and John B. Braunwarth, Crystal Lake, Ill., assignors to The Pure Oil Company, Chicago, Ill., a corporation of Ohio No Drawing. Filed Dec. 13, 1956, Ser. No. 628,008

16 Claims. (Cl. 260—539)

This invention relates to a method of preparing omega-halogen-substituted aliphatic acids and ketones, and, more particularly, to the preparation of these products by the reaction of halogens with the product formed by the reaction of a ferrous salt with cyclic organic hydroperoxides.

Many of the reactions of hydroperoxides are known in the prior art. E. G. E. Hawkins in his article entitled, "Reactions of Organic Peroxides. Part II. Reactions of αα-Dimethyl Benzyl Hydroperoxide ("iso-Propylbenzene Hydroperoxide")" (J. Chem. Soc., 1950, 2169) shows the decomposition of αα-dimethylbenzyl hydroperoxide by ferrous sulfate under the influence of various catalysts, and under thermal conditions, to form mixtures of 2-phenylpropan-2-ol, acetophenone, and α-methylstyrene. The hydroperoxides were first shown by Hock and Lang (Ber., 77, 257 (1944)) to be formed by the oxidation of isopropylbenzene with air to give $Ph \cdot CMe_2OOH$. Improved methods for their preparation are described by Armstrong, Hall and Quin, British patents 610,293 and 630,286; J. Chem. Soc. 1950, 666. E. G. E. Hawkins and P. P. Young (J. Chem. Soc. 1950, 2804) state that the reaction of methylcyclopentyl hydroperoxide with ferrous sulfate solution gives rise to the formation of dodecane-2,11-dione. However, the use of methylcyclohexyl hydroperoxide gives poorer yields of tetradecane-2,13-dione. N. Brown et al. (J. Am. Chem. Soc., 77, 1756 (1955)) describe the preparation of "cyclohexanone peroxide" by the autocatalyzed, liquid phase oxidation of cyclohexanol with oxygen. Reaction of these peroxides with ferrous ion in hydrocarbon solution is said by Brown et al. to produce a 68% yield of 1,12-dodecanedioic acid.

M. S. Kharasch and W. Nudenberg in their article entitled, "Detection of Free Radicals in Solution. III. Formation of Long-Chain, α,ω-Dicarboxylic Acids" (J. Org. Chem., 19, 1921 (1954)) indicate that the decomposition of cyclohexanol hydroperoxide in the presence of ferrous ion and butadiene gives rise to $C_{20}$ unsaturated dicarboxylic acids each containing two residues of cyclohexanol hydroperoxide and butadiene.

It has been found in accordance with this invention that compounds of a cyclic structure having a peroxide grouping attached directly to one of the carbon atoms in said cyclic structure when decomposed, as with the ferrous ion, in the presence of a halogen, yield a main product which is not a dimerization product, but is an omega-halogen-substituted aliphatic acid or ketone derived from only one alicyclic nucleus. The reactions involved in the process of this invention are represented broadly as follows:

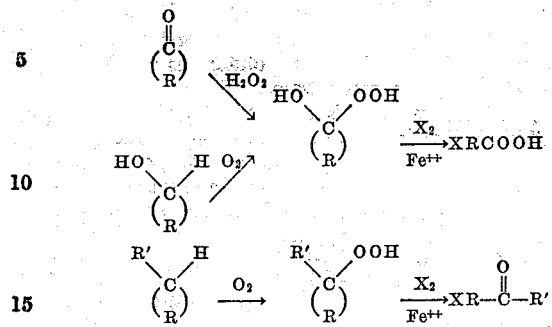

Wherein R is a divalent radical which may consist of unsubstituted methylene chains or may contain one or more hydrocarbyl or other substituents of the group consisting of methyl, ethyl, propyl, butyl, benzyl, phenyl, cyclohexyl, chloro, fluoro, hydroxy, methoxy, carboxy, carbalkoxy and keto radicals, and R' is an alkyl group of 1–6 carbon atoms. The primary ring structure may also contain one or more non-aromatic double bonds, or phenylene or cyclohexylene substituents; X represents a halogen such as chlorine, bromine, iodine, or fluorine.

Examples of R in the above equations and formulae include

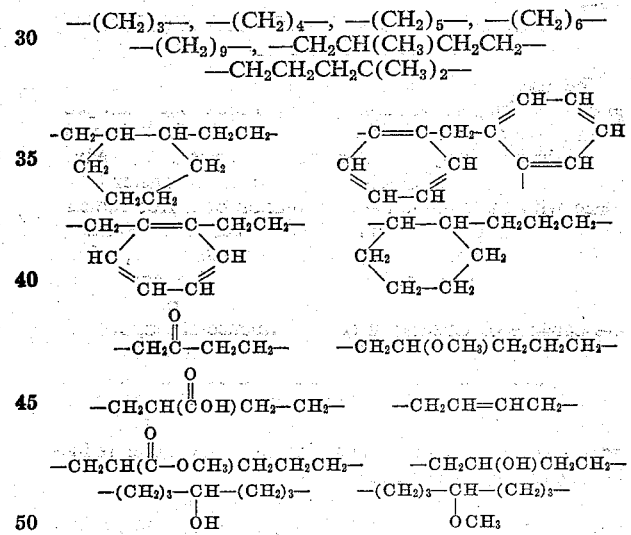

and similar structures.

The halogens that may be used in the above synthesis include bromine, iodine, chlorine, or fluorine.

The term "peroxide compound" as used herein is broadly intended to cover compounds of the formulas set forth above and includes compounds which in the strict sense are defined as hydroperoxides. The preferred starting materials are peroxides of the type obtainable by the reaction of oxygen with cycloalkanols and alkylcycloalkanes, or hydrogen peroxide with cycloalkanones. Examples are the peroxide compounds obtained from the reaction of hydrogen peroxide with cyclopentanone and cyclohexanone (where $R = -(CH_2)_4-$ and $-(CH_2)_5-$, respectively), and the oxidation products of alicyclic alcohols and hydrocarbons. These include cyclopentanone peroxide, cyclohexanone, peroxide, cycloheptanone, peroxide, methylcyclohexyl hydroperoxide, ethylcyclopentyl hydroperoxide, etc., following the above definitions for R.

The reactions of this invention may be more specifically illustrated by the following equations representing cyclohexanol hydroperoxide and bromine in a reaction medium consisting of acidified aqueous methanol containing ferrous sulfate:

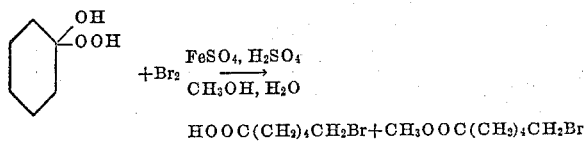

$$HOOC(CH_2)_4CH_2Br + CH_3OOC(CH_2)_4CH_2Br$$

This product, omega-bromocaproic acid and its methyl ester, is easily separated from the solution as an organic phase by dilution with more water. When the omega-bromocaproic acid present is subjected to esterification with methyl alcohol in the presence of p-toluenesulfonic acid as a catalyst, the methyl omega-bromocaproate may be isolated and purified by distillation at reduced pressure. The equation for the esterification is as follows:

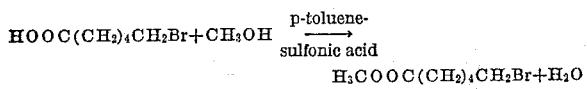

The structure of the methyl omega-bromocaproate is proven by treating it with potassium cyanide to form methyl omega-cyanocaproate by the following reaction:

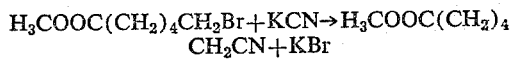

hydrolyzing the nitrile in alkaline medium,

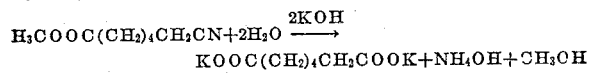

and acidifying the product of this hydrolysis to yield the free dibasic acid known and identified as pimelic acid,

The use of reduction-oxidation conditions is essential to convert the peroxide compounds to the omega-halogen-substituted aliphatic acids. The term "redox" is used herein in its widely accepted sense to designate a reduction-oxidation reaction wherein an electron transfer takes place with the simultaneous formation of a free radical. In order for this reaction to take place it is necessary that there be present a substance, or substances, which acts as a reducing agent for the peroxide compound. Those lower valence compounds of heavy metals which are capable of existing in several valence states, such as iron, chromium, manganese, cobalt, copper and molybdenum, are suitable reducing agents to be used. Certain organic and inorganic compounds may also be used, such as sodium bisulfite, reducing sugars, 1-ascorbic acid, sodium formaldehyde sulfoxylate, and other reducing agents known in the redox art.

The invention will be illustrated by the use of the ferrous ion but is not to be limited thereby. In general, when using a metal ion such as ferrous ion alone, the amount of ion used is equivalent to, or in excess of, the amount of peroxide to be reacted. Ions in higher valence states may be used in trace amounts as promoters with any one of the afore-mentioned reducing agents which serve to convert, for example, the ferric ion to the ferrous ion. Because of low cost, availability and efficiency, the ferrous ion is preferred in the reaction.

The reaction of this invention for the conversion of cyclic peroxide compounds to long-chain, omega-halogen-substituted carboxylic acids can be carried out in various solvents such as water, methanol, aromatic hydrocarbons, ethers, esters, dioxane, or other mixtures, or in the emulsion state. Pressures below or slightly above atmospheric may be used. In general, the reaction proceeds at atmospheric pressure and at temperatures in the range of $-100°$ C. to $30°$ C. or higher. The reaction is best carried out at low temperatures in the order of $0°$ C., as illustrated in the examples. Since the peroxides are explosive, care should be taken in carrying out the reaction to avoid reaching temperatures and pressures of thermal decomposition of the peroxides. The reaction is best carried out in a solvent common for the peroxide compound, the halogen and the reducing agent, since thereby rapid intermixture of reactants is possible and side-reactions are minimized. When inorganic ferrous salts are used as the reducing agent, aqueous methanol is the preferred common solvent. Non-aqueous media may be used with ferrous salts of fatty acids. In conducting the reaction in the emulsion state using immiscible but selective solvents for the peroxide and halogen reactants, the use of a dispersion agent brings about proper intermixing.

The reactions may be carried out in a neutral or acid environment and in a batchwise or continuous manner. Some species of the peroxide reactants are highly explosive and quite sensitive to shock. Accordingly, precautions should be taken in handling these materials.

The omega-halogen-substituted aliphatic acids and ketones of this invention may be separated from the reaction mixture by various means known in the art, such as withdrawal of an organic phase after dilution with water. The acids can be transformed into salts, and separated by distillation, extraction, ion-exchange techniques, or selective adsorption. The ferric ion by-product of the reaction can be recovered as such by ion-exchange, or by reduction, for recycling to the process.

In order to illustrate the invention, the following example is given showing the preparation of omega-bromocaproic acid from cyclohexanol hydroperoxide ("cyclohexanone peroxide").

*Example I*

Cyclohexanone peroxide (0.49 mole) in 750 cc. of methyl alcohol was cooled to $0°$ C. and 0.3 mole of liquid bromine was added with stirring. Then a solution containing 147 gm. (0.53 mole) of ferrous sulfate heptahydrate, 25 cc. of sulfuric acid, and 250 cc. of distilled water was added dropwise to the reaction mixture over a period of two hours.

After the ferrous salt addition was completed, the mixture was diluted with two liters of water and the organic phase was collected by extraction with benzene. The benzene solution was washed three times with 50 cc. portions of water, and then was dried over $CaSO_4$. This solution in benzene was filtered and distilled to remove benzene and unreacted cyclohexanone. (Our "cyclohexanone peroxide" was prepared prior to the bromination in an excess of cyclohexanone).

The bromo-acid product was then esterified by the addition of 200 cc. of methyl alcohol and 8 gm. of p-toluenesulfonic acid as catalyst and refluxed for 18 hours. The mixture was diluted with 200 cc. of water and the organic phase was again collected in benzene and worked up by water washing and ($CaSO_4$) drying. The benzene solution was then filtered and distilled to remove the benzene. Using a 12-inch Vigreaux column, 55.7 gm. of methyl omega-bromocaproate was collected at 120–123° C. at 13 mm. pressure. Yield based on cyclohexanone peroxide—54 mole percent.

*Analysis.*—Calculated for $C_7H_{13}BrO_2$: Carbon—40.2%; Hydrogen—6.2%; Bromine—38.3%; Molecular wt.—209. Found: Carbon—40.7%; Hydrogen—6.3%; Bromine—32.7%; Molecular wt.—198.

The structure of the product was confirmed by conversion to a dibasic acid by replacement of the bromine with the cyano group, and subsequent hydrolysis. The melting point, and mixed melting point with a known sample of pimelic acid, showed this product to be identical with pimelic acid, and therefore proved that the bromo-ester was methyl omega-bromocaproate.

By the process disclosed herein, methylcyclohexane may be converted via its hydroperoxide to 7-bromo-2-heptanone or cyclopentanone may be converted to ω-chlorovaleric acid. The use of chlorine as a reactant generally requires lower reaction temperatures or higher pressures to maintain a desirable chlorine concentration in the reaction mixture.

From the foregoing description it becomes apparent that the invention broadly lies in the finding that compounds of the general structure.

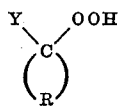

may be converted into compounds of the general structure

by reaction under redox conditions with a halogen wherein X in the above formulas represents a halogen selected from the group consisting of fluorine, chlorine, bromine and iodine, Y is selected from the group of hydroxyl and alkyl groups of 1 to 6 carbon atoms, and R is a divalent radical comprising unsubstituted methylene chains or substituted chains containing one or more substituents of the group consisting of methyl, ethyl, propyl, butyl, benzyl, phenyl cyclohexyl, chloro, fluoro, hydroxy, methoxy, carboxy, carbalkoxy and keto groupings. Stated briefly, the invention applies to the conversion of the cyclic peroxide structure

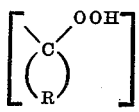

to the halo-substituted carbonyl structure:

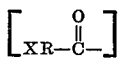

to include both the carboxylic acid series and the ketones falling within the above general formula depending on the nature of the group satisfying the remaining valence of the carbon atom. The omega-substituted carboxylic acids and ketones prepared by the reaction of this invention are useful as organic starting materials utilizing the omega position of the halogen. The various products that may be made include dibasic acids which are useful in many way including transformation to salts and esters for use as lubricating oil addends. Having thus defined the invention, the only limitations thereon appear in the appended claims.

What is claimed is:

1. The process which comprises converting a compound of the general formula (I) 

into a compound of the general formula (II) 

wherein in said formulas, X is a halogen selected from the group of chlorine and bromine, Y is a substituent selected from the group of hydroxyl, and alkyl groups of 1 to 6 carbon atoms, and R is a divalent hydrocarbon radical free of olefinic double bonds and containing from 3 to 9 carbon atoms, by reaction of compounds of formula I with said halogen in the presence of a redox reducing agent at a temperature not greater than about 30° C. sufficient to effect the reaction and separating a compound of Formula II from the resulting reaction mixture.

2. The process in accordance with claim 1 in which the halogen is chlorine.

3. The process in accordance with claim 1 in which the halogen is bromine.

4. The process in accordance with claim 1 in which said reaction is conducted in the presence of a redox reducing agent comprising a heavy metal ion capable of existing in several valence states and by the use of temperatures ranging from about −100° C. to 30° C. in the presence of a mutual solvent.

5. The method in accordance with claim 4 in which the heavy metal ion is selected from the group consisting of the ferrous ion, chromous ion, manganous ion, cobaltous ion and the cuprous ion, same being obtained from salts thereof.

6. The method in accordance with claim 5 in which the heavy metal ion is the ferrous ion.

7. The method in accordance with claim 1 in which Y is an hydroxyl group.

8. The method in accordance with claim 1 in which Y is an alkyl group of 1 to 6 carbon atoms.

9. The method in accordance with claim 1 in which R in Formula I is a tetramethylene group.

10. The method in accordance with claim 1 in which R in Formula I is a pentamethylene group.

11. The method in accordance with claim 1 in which the compounds of Formula I are selected from the group of cycloalkanol hydroperoxides and alkylcycloalkane peroxides.

12. The method in accordance with claim 1 in which the compounds of Formula I are cycloalkanol hydroperoxides and the end product of the reaction is an omega-halogen substituted aliphatic acid.

13. The method in accordance with claim 1 in which the compounds of Formula I are alkylcycloalkane hydroperoxides and the end product of the reaction is an omega-halogen substituted ketone.

14. The method of preparing 7-bromo-2-heptanone which comprises reacting methylcyclohexane hydroperoxide with liquid bromine in the presence of ferrous sulfate in an aqueous acid solution at about 0° C. and separating 7-bromo-2-heptanone from the reaction mixture.

15. The method of preparing omega-chlorovaleric acid which comprises reacting cyclopentanol hydroperoxide with chlorine in the presence of ferrous sulfate in an aqueous acid solution at a temperature of not more than about 0° C. sufficient to effect the reaction and separating omega-chlorovaleric acid from the reaction mixture.

16. The method of preparing omega-bromocaproic acid which comprises reacting cyclohexanol hydroperoxide with bromine in the presence of ferrous sulfate in an aqueous acid solution at a temperature of not more than about 30° C. sufficient to effect the reaction and separating omega-bromocaproic acid from the reaction mixture.

References Cited in the file of this patent

UNITED STATES PATENTS 2,844,627   Noether _____ July 22, 1958

OTHER REFERENCES

Hawkins et al.: Jour. Chem. Soc. (London), pp. 2804–2808 (1950).